United States Patent Office 3,506,700
Patented Apr. 14, 1970

3,506,700
ALKALI METAL ALUMINUM COMPLEXES AND
THEIR PREPARATION
Gottfried J. Brendel, Baton Rouge, La., assignor to Ethyl Corporation, New York, N.Y., a corporation of Virginia
No Drawing. Filed Oct. 27, 1967, Ser. No. 678,534
Int. Cl. C07f 5/06
U.S. Cl. 260—448    10 Claims

ABSTRACT OF THE DISCLOSURE

Complex alkali metal aluminum alkyl hydride compounds e.g., $NaAl(C_2H_5)_4 \cdot 4AlH_3$;

$$NaAl(C_2H_5)_2H_2 \cdot (C_2H_5)_2AlH \cdot 3AlH_3$$

and their preparation are described. The complexes contain from 8 to 12 hydrogen atoms per molecule and are useful as selective chemical reducing agents, sources of hydrogen gas, and in the preparation of polymerization catalysts.

---

This invention relates to, and has as its principal object the provision of novel complex alkali metal aluminum alkyl hydride compounds, mixtures thereof, and methods for their preparation.

The compounds of this invention have the empirical molecular formula:

$$MAl_nR_{n-1}H_{2n+2}$$

where M is an alkali metal, R is an alkyl radical and $n$ is from 3 to 5. Illustrative of such compounds are the following:

$NaAl(C_2H_5)_4 \cdot 4AlH_3$
$NaAl(C_2H_5)_3H \cdot 3AlH_3$
$NaAl(C_2H_5)_2H_2 \cdot 2AlH_3$
$NaAl(C_4H_9)_4 \cdot 4AlH_3$
$NaAl(C_4H_9)_3H \cdot 3AlH_3$
$NaAl(C_4H_9)_2H_2 \cdot 2AlH_3$
$LiAl(C_6H_{13})_4 \cdot 4AlH_3$
$KAl(C_8H_{17})_4 \cdot 4AlH_3$
$CsAl(CH_3)_3H \cdot 3AlH_3$
$RbAl(C_{10}H_{21})_3H \cdot 3AlH_3$
$KAl(C_3H_7)_2H_2 \cdot 2AlH_3$
$NaAl(C_2H_5)_2H_2 \cdot (C_2H_5)_2AlH \cdot 3AlH_3$ It will be noted that the complexes of this invention contain from 8 to 12 hydrogen atoms per molecule. For this reason, they are well suited for use as selective chemical reducing agents and for sources of hydrogen gas. They may also be employed along with transition metal halide salts (e.g., $TiCl_4$, $TiCl_3$, $VCl_4$, etc.) in the preparation of highly active catalysts for polymerizing alpha-olefin monomers (e.g., ethylene, propylene, etc.) using procedures of the type described by Ziegler, Natta, and their colleagues.

The foregoing complexes are prepared by reacting an alkali metal aluminum compound having the formula:

$$MAlR_{4-x}H_x$$

where M is an alkali metal, R is an alkyl radical and $x$ is from 0 to 2, with metallic aluminum and hydrogen in an ether or amine reaction medium at a temperature in the range of from about 25 to about 170° C. and under a hydrogen atmosphere of from about 500 to about 5000 p.s.i. The aluminum used in this reaction is preferably in subdivided form, such as chips, turnings, powder or the like. For best results the particulate aluminum should be activated by procedures well known to those skilled in the art. Exemplary of such aluminum activation procedures are those referred to or described in U.S. 2,885,-314; 2,892,738; 2,921,876; and 3,100,786. The use of hydrogenation accelerators is also advantageous. See for example U.S. 3,050,540 and 3,050,541.

As is apparent from the above formula, the alkali metal aluminum compound used in this process is an alkali metal aluminum tetraalkyl ($x=0$), an alkali metal aluminum trialkylhydride ($x=1$), or an alkali metal aluminum dialkyldihydride ($x=2$). Mixtures of such compounds of any one of these individual types or of two or more of these types may be used. Generally speaking these reactants will contain alkyl groups, straight or branched chain, ranging from methyl through about tetradecyl. In other words, the alkyl groups in these reactants can be the same or different and each will contain from 1 to about 14 carbon atoms. Reactants wherein the alkyl groups are ethyl, propyl, isopropyl, butyl, sec-butyl, isobutyl, tert-butyl, and like homologous radicals containing up to about 6 carbon atoms are preferred as these are easier to prepare and involve the use of cheaper starting materials. In most cases, it is preferred that all of the alkyl groups in this reactant be the same.

Any ether and/or amine which is liquid under the reaction conditions may be used as the reaction diluent. Inasmuch as the reaction is carried out under hydrogen pressure, unsaturated ethers and amines tend strongly to be hydrogenated under the conditions of the reaction but under most circumstances this does not adversely affect the desired reaction. It simply consumes hydrogen. Nevertheless it is normally preferably to utilize a saturated aliphatic or cycloaliphatic ether such as a suitable dialkyl ether, or polyether (glycol ether). Exemplary of such materials are diethyl ether, dibutyl ether, diamyl ether, dihexyl ether, tetrahydrofuran, the dimethyl ether of diethylene glycol, the dimethyl ether of triethylene glycol, the dimethyl ether of tetraethylene glycol, the diethyl ether of diethylene glycol, the diethyl ether of triethylene glycol, the diethyl ether of tetraethylene glycol, dioxane, and the like. However, as noted, other ethers such as dicyclohexyl ether, diphenyl ether, di-biphenyl ether, dibenzyl ether, and the like are also suitable. By the same token it is normally preferable when utilizing an amine to employ a saturated aliphatic or cycloaliphatic amine although other amines (primary, secondary and tertiary) may be used. Typical amines for use in this process include propyl amine, isopropyl amine, butyl amine, diethyl amine, dioctyl amine, diphenyl amine, triethyl amine, tributyl amine, trihexyl amine, triphenyl amine, tribenzyl amine, pyridine, triethylene diamine, alpha-naphthyl amine, beta-naphthyl amine, and the like. Mixtures of one or more amines or one or more ethers, or mixtures of amine(s) with ether(s) may be used. In addition, the amine(s) and/or ether(s) may be admixed with other solvents which are inert to the reactants and products. It will of course be understood and appreciated that the system should be essentially anhydrous during the course of the reaction.

The reaction rate tends to increase with increasing temperature and pressure and usually ranges from a few minutes up to 12 to 15 hours. Thus the particular reaction time selected will depend on such factors as the extent of activation of the metallic aluminum, its state of subdivision, the particular reaction temperature and reaction pressure being employed, the extent of agitation, and the like. Uptake of hydrogen gas as evidenced, for example, by a pressure drop in the system, serves as a convenient index of the course of the reaction. In most cases it is preferable to use temperatures in the range of from about 70 to about 130° C. and pressures of from about 1000 to about 2000 p.s.i. It is helpful to agitate the contents of the reaction system to promote intimate contact among the reactants.

In most cases the product of this invention will involve mixtures of individual species of the general formula first above set forth. This arises by virtue of the fact that although one individual species tends to be the initial product of the reaction, this complex product tends to undergo redistribution or disproportionation. For example, when reacting sodium aluminum tetrabutyl with aluminum and hydrogen in accordance with the process of this invention, the initial product definitely appears to be sodium aluminum tetrabutyl complexed with four molecular equivalents of alane (aluminum hydride, $AlH_3$). However, this product once formed is susceptible to internal disproportionation to yield such additional coproducts as $NaAl(C_4H_9)_2H_2 \cdot (C_4H_9)_2AlH \cdot 3AlH_3$. Similar types of rearrangements have been found to exist in the case of other complex alkali metal aluminum alkyl hydride systems. See for example, Kobetz et al., Inorganic Chemistry, vol. 2, No. 4, August 1963, pp. 859–861. Because of the existence of such disproportionation opportunities, it is generally more accurate to refer to the novel products of this invention in terms of their over-all empirical molecular formula. In addition, the ether and amine diluents may participate in the reaction through the exertion of their well known tendencies to form stable complexes with alkyl aluminum compounds. Thus at least in some instances the complexes of this invention may be further complexed with the ether or amine used as the reaction diluent.

It is pertinent to observe that the initial species produced in accordance with this invention contain from 2 to 4 molecular equivalents of alane which result, inter alia, from reaction between aluminum and hydrogen. As pointed out in the prior art (U.S. 3,032,574) alane itself cannot be prepared directly from aluminum and hydrogen.

This invention is illustrated by the following typical examples which are not to be construed as limiting.

EXAMPLE I

Into an autoclave were charged 75 ml. of a solution of 2.6 grams of sodium aluminum tetraethyl in the dimethyl ether of diethylene glycol, and 10 grams of activated aluminum powder (0.37 gram atoms). The system was pressurized with hydrogen (5000 p.s.i.) and heated at 130° C. for 12 hours. Thereupon the resulting solution was filtered to remove unreacted aluminum. Chemical analysis of the product (aluminum content and gas evolution analysis) indicated the formation, inter alia, of $NaAl_5(C_2H_5)_4H_{12}$.

EXAMPLE II

The procedure of Example I was repeated in the same manner with the exception that 2.25 grams of sodium aluminum triethyl hydride in 75 ml. of the dimethyl ether of diethylene glycol was used as the alkali metal aluminum reactant. During the course of the reaction a steady pressure drop of 350 p.s.i. occurred. After filtering off unreacted aluminum, the product was subjected to the same analytical procedures. The formation of $$NaAl_4(C_2H_5)_3H \cdot 3AlH_3$$

was indicated by these analyses.

Similar results are obtained using other reactants such as set forth above. For example, $NaAl_3(C_2H_5)_2H_2 \cdot 2AlH_3$ is formed when using sodium aluminum diethyl dihydride as the alkali metal aluminum reactant in the foregoing procedures.

What I claim is:

1. An alkyl aluminum hydride complex having the empirical molecular formula $$MAl_nR_{n-1}H_{2n+2}$$

where M is an alkali metal, R is an alkyl radical and $n$ is from 3 to 5.

2. The complex of claim 1 wherein the alkali metal is sodium.

3. The complex of claim 1 wherein $n$ is essentially 4.

4. The complex of claim 1 wherein $n$ is essentially 5.

5. The complex of claim 1 consisting essentially of $NaAl(C_2H_5)_4 \cdot 4AlH_3$ and disproportionation products thereof.

6. The complex of claim 1 consisting essentially of $NaAl(C_2H_5)_3H \cdot 3AlH_3$ and disproportionation products thereof.

7. The process of preparing a complex of claim 1 which comprises effecting reaction in a system consisting essentially of an alkali metal aluminum compound, hereinafter defined, metallic aluminum, hydrogen and an ether reaction medium at a temperature in the range of at least about 130° C. but not above about 170° C., under a hydrogen atmosphere of from about 500 to about 5000 p.s.i., and for a time up to about twelve hours sufficient to effect formation of said complex, said alkali metal aluminum compound having the formula $MAlR_{4-x}H_x$ where M is an alkali metal, R is an alkyl radical and $x$ is from 0 to 2.

8. The process of claim 7 wherein M is sodium.

9. The process of claim 7 wherein said alkali metal aluminum compound is sodium aluminum tetraethyl.

10. The process of claim 7 wherein said alkali metal aluminum compound is sodium aluminum triethyl hydride.

References Cited

UNITED STATES PATENTS

| | | |
|---|---|---|
| 2,826,598 | 3/1958 | Ziegler et al. |
| 2,989,557 | 6/1961 | Blitzer et al. |
| 3,013,042 | 12/1961 | Blitzer et al. |
| 3,030,400 | 4/1962 | Giraitis. |
| 3,032,574 | 5/1962 | Ziegler et al. |
| 3,050,540 | 8/1962 | Gould. |
| 3,092,648 | 6/1963 | Köster. |

OTHER REFERENCES

Lehmkuhl, Angew. Chem. international Edit. vol. 3 (1964), p. 110.

Kobetz et al., Inorganic Chemistry, vol. 2 (1963), pp. 859–861.

TOBIAS E. LEVOW, Primary Examiner

H. M. S. SNEED, Assistant Examiner

U.S. Cl. X.R.

252—431; 23—210